B. V. HOW.
CROSS BEARING ALIDADE.
APPLICATION FILED JULY 8, 1908.

965,462.

Patented July 26, 1910.

WITNESSES

INVENTOR
Benjamin Varnum How
by his Attorney

UNITED STATES PATENT OFFICE.

BENJAMIN VARNUM HOW, OF WESTON, MASSACHUSETTS, ASSIGNOR TO ARBECAM NAUTICAL INSTRUMENT CO., OF BOSTON, MASSACHUSETTS, A CORPORATION OF MASSACHUSETTS.

CROSS-BEARING ALIDADE.

965,462.

Specification of Letters Patent. Patented July 26, 1910.

Application filed July 8, 1908. Serial No. 442,510.

*To all whom it may concern:*

Be it known that I, BENJAMIN VARNUM HOW, of Weston, in the county of Middlesex and State of Massachusetts, have invented certain new and useful Improvements in Cross-Bearing Alidades, of which the following is a specification.

This invention is an improvement in nautical instruments used for the purpose of determining the bearings of ships at sea, and it is especially designed for obtaining cross bearings on vessels equipped with the Arbecam alidade, patented Dec. 26, 1905, No. 808,270, or with equivalent apparatus. Said Arbecam instrument has a telescope or sighting tube pivoted to the top of a vertical rotatable shaft supported by the binnacle hood or top, and at the foot of such shaft is an indicating pointer resting on the compass plate within the binnacle and maintained in radial alinement with said sighting device in its movements, the object being to indicate on the compass dial, by said pointer, the nautical bearing of points to which the telescope is directed.

My present improvement may be used with or without such inclosed pointer, and consists, primarily, of a cross-bearing plate or ring surrounding the shaft at the top of the binnacle, graduated marginally in degrees or points to correspond with the compass dial below it, and adjustable to right or left by partial rotation.

Other features of this invention include the mounting of said plate, and the shaft which supports the sighting tube, upon gimbals with a counter weight within the binnacle secured to the foot of such shaft; also a flanged cap to prevent water from entering where such parts move in the binnacle top.

Figure 1:
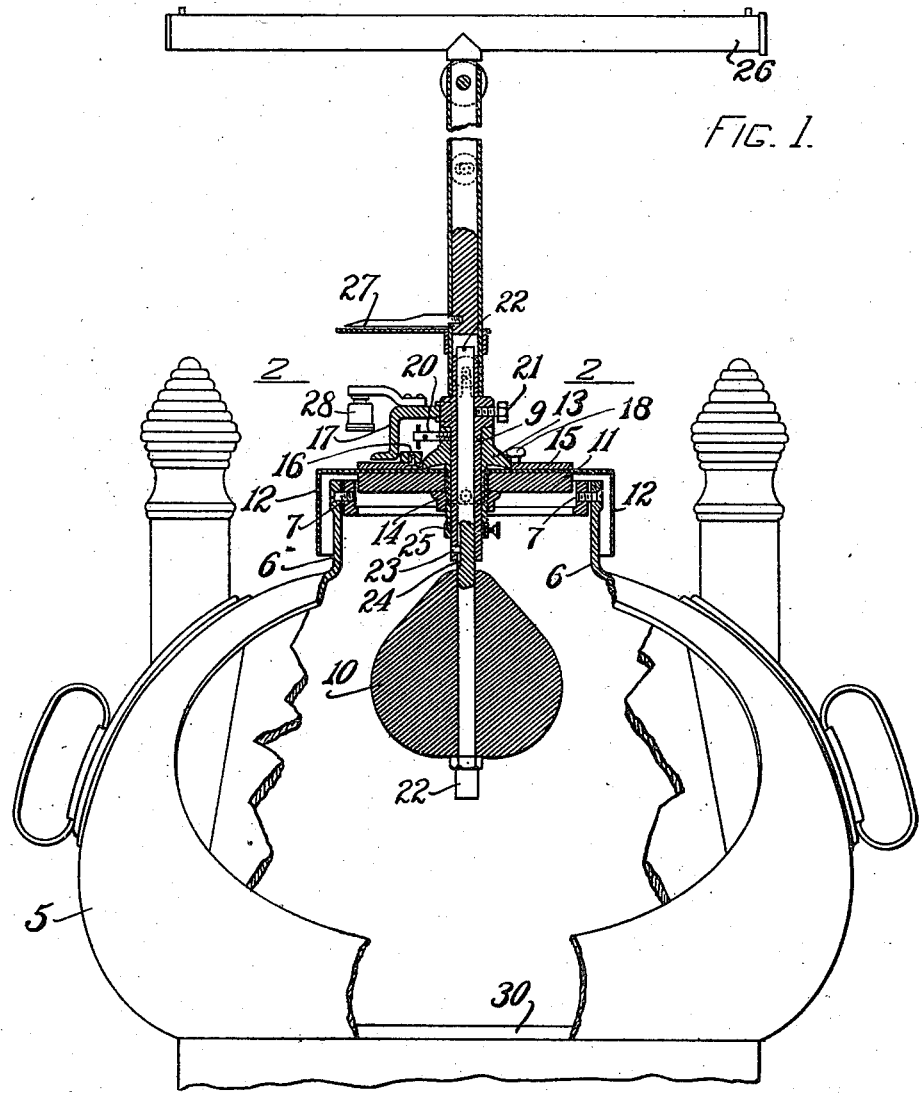
Figure 2:
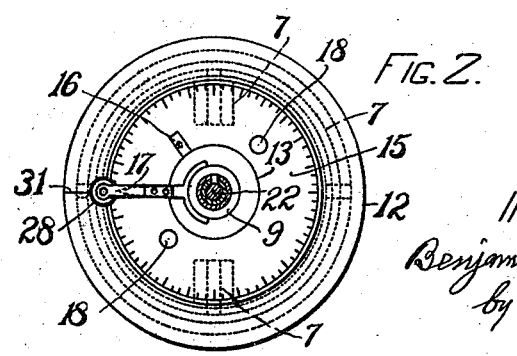

In the drawing Figure 1 represents a ship's binnacle, partly broken away, with my improvements mounted in its upper portion and shown in vertical section. Fig. 2 is a sectional plan of my improvement on line 2—2 of Fig. 1.

The binnacle 5 is in the main, of a well known form, which may be varied as desired. As here shown part of the front is broken away to show the interior. Its upper portion 6, shown in section, is of tubular form and has within its top a substantial gimbal joint 7 as a mounting for the vertical shaft 9 which supports telescope 26 and the lead counter-weight 10, together with other parts hereinafter referred to. The members of the gimbal joint are, of course, pivoted together on diameters perpendicular to each other. Supported horizontally on the inner plate 11 of the gimbal joint 7 is a hood 12 which is designed to prevent moisture from reaching the binnacle, and at the same time to permit the necessary play of said joint. This hood is secured by the threaded cap piece 13 which is drawn tight by nut 14 underneath, thus locking hood 12 to plate 11. The periphery of cap 13 forms a journal of rotation for the marginally graduated annular plate 15, the fit and surface friction being sufficient to cause such plate or ring to remain in any position desired without clamping devices. This ring or plate 15 is adjustable, being provided with a setting lug 16, so placed that when in line with the indicator 17, mounted on shaft 9, said indicator will point to the zero mark of the plate. Auxiliary knobs 18, Fig. 2, on plate 15, serve as handles for rotating it. Set-screw 20 serves, when desired, to secure shaft 9 to cap 13 and prevent rotation of same. Binding-screw 21 maintains spindle 22 in position within shaft 9 and thus indirectly supports weight 10 securely. Such spindle is held against rotation therein by a pin 23 and slot 24, in any desired position vertically. This permits the proper adjustment of the weight 10 to accommodate the different heights of different binnacles so that the arc of the swing of the weight will not be so high as to intersect the side line of the binnacle and at the same time it will be clear of the compass face. Collar 25, secured to shaft 9, prevents the removal of the shaft upwardly.

The mounting of telescope 26 may be similar to that shown in said Arbecam Patent No. 808,270 and is, therefore, not further described in detail here.

A pilot lamp is indicated at 28, mounted upon the indicator 17, which latter is secured to shaft 9.

The compass, shown by its top plate 30, is of ordinary construction and, in the application of my present device, serves to give the magnetic course, which can then be laid off by means of lubber-mark 31 and dial 15. Lubber mark 31 is in line with the bow of the ship and the center of the binnacle 5, and the dial 15 is moved so that the proper number of degrees from its zero mark is set opposite lubber mark 31. Indicator 17 is brought into conjunction with lug 16, thus bringing telescope 26 in line with the magnetic pole and also the zero mark of dial 15. Cross bearings can now be taken by means of the telescope 26 from this magnetic pole and read on dial 15.

By use of deviation corrector 27, adjusted as explained in the Camden Patent No. 790,871, when the amount of deviation is known, corrected bearings from the true meridian may be taken, without necessity of any subsequent calculation.

I claim as my invention:—

1. The improvement in means for determining ships' bearings, comprising a binnacle, a vertical, rotatable shaft therein and a pivoted sighting device at top of such shaft, in combination with a horizontally adjustable, marginally graduated annular plate, rotatable independently of said shaft and with a radial pointer fixed on and rotating with such shaft above said plate, substantially as set forth.

2. The improvement in means for determining ships' bearings, comprising a binnacle with compass therein, a gimbal joint at the top of the binnacle, a vertical, rotatable shaft supported by said joint and projecting above and below it, with a sighting device at the top and a depending weight at bottom of such shaft, in combination with an annular, graduated plate surrounding said shaft, above such joint, and means for adjusting said plate radially thereon, and with a radial pointer fixed on and rotating with such shaft above said plate, substantially as set forth.

3. A ship's binnacle provided in its upper portion with a gimbal joint, a flanged hood or cap covering and inclosing said joint and an adjustable, marginally graduated, annular plate resting on said cap, in combination with a rotatable vertical shaft extending through said cap and plate, a sighting device above and a heavy depending weight below them, carried by said shaft, and with an indicating pointer on said shaft and adjusting knobs on said plate, substantially as set forth.

4. In a device of the class described, a plate, a binnacle casing, a gimbal joint for supporting said plate on said casing, a sleeve rotatably supported by said plate and projecting above and below it, a shaft longitudinally movable in said sleeve, a depending weight mounted on said shaft and means for holding said shaft vertically adjustable in said sleeve.

In testimony whereof I have affixed my signature, in presence of two witnesses.

BENJAMIN VARNUM HOW.

Witnesses:
A. H. SPENCER,
MARY I. HOW.